US 6,569,045 B1

(12) United States Patent
Campagnolo

(10) Patent No.: US 6,569,045 B1
(45) Date of Patent: May 27, 2003

(54) GEAR-CHANGE SYSTEM INCLUDING A SENSOR DEVICE FOR DETECTING THE OPERATION OF A GEAR CHANGE FOR BICYCLES

(75) Inventor: Valentino Campagnolo, Vicenza (IT)

(73) Assignee: Campagnolo Srl (IT)

( * ) Notice: Subject to any disclaimer, the term of this patent is extended or adjusted under 35 U.S.C. 154(b) by 0 days.

(21) Appl. No.: 09/711,076

(22) Filed: Nov. 14, 2000

(30) Foreign Application Priority Data

Nov. 26, 1999 (IT) ........................................ TO99A1039

(51) Int. Cl.$^7$ .............................. F16H 63/08; G01P 3/66
(52) U.S. Cl. ........................ 474/70; 474/80; 73/514.35; 340/498
(58) Field of Search ............................ 474/70, 80, 82, 474/81, 78; 340/432, 815.45, 815.53, 456, 461, 525, 498; 73/54.61, 570, 862.195, 494, 514.35; 74/489, 502.2, 500.5, 501.5, 502.1; 280/236, 238; 24/13.5 K, 135 R

(56) References Cited

U.S. PATENT DOCUMENTS 3,868,193 A * 2/1975 Schott ...................... 24/135 R
3,999,340 A * 12/1976 Bogese et al. ............. 24/135 K
5,119,607 A * 6/1992 Horning et al. ........... 24/115 R
5,178,033 A * 1/1993 Kund ........................ 74/502.2
5,551,315 A * 9/1996 Pikoulas ...................... 474/70
5,903,214 A * 5/1999 Watarai ...................... 340/456
6,199,021 B1 * 3/2001 Cote et al. .................... 73/570

FOREIGN PATENT DOCUMENTS

EP 647556 * 12/1995

* cited by examiner

Primary Examiner—Marcus Charles
(74) Attorney, Agent, or Firm—Volpe and Koenig, P.C.

(57) ABSTRACT

A sensor device for detecting for detecting the operating position of a gear-change system for bicycles comprises a shell positioned at any point along the flexible control cable of a bicycle derailleur, between the derailleur and the control device. The shell is in a fixed position while the flexible control cable, which transverses it, is movable. A reference member is movable, together with the cable, inside the shell. The device comprises a detector for detecting the position of the reference member with respect to the shell, which consist of a potentiometric sensor comprising a movable contact carried by the reference member and an electrically conductive channel carried inside the shell of the sensor, on which the movable contact is fitted in such a way that it can slide.

25 Claims, 4 Drawing Sheets

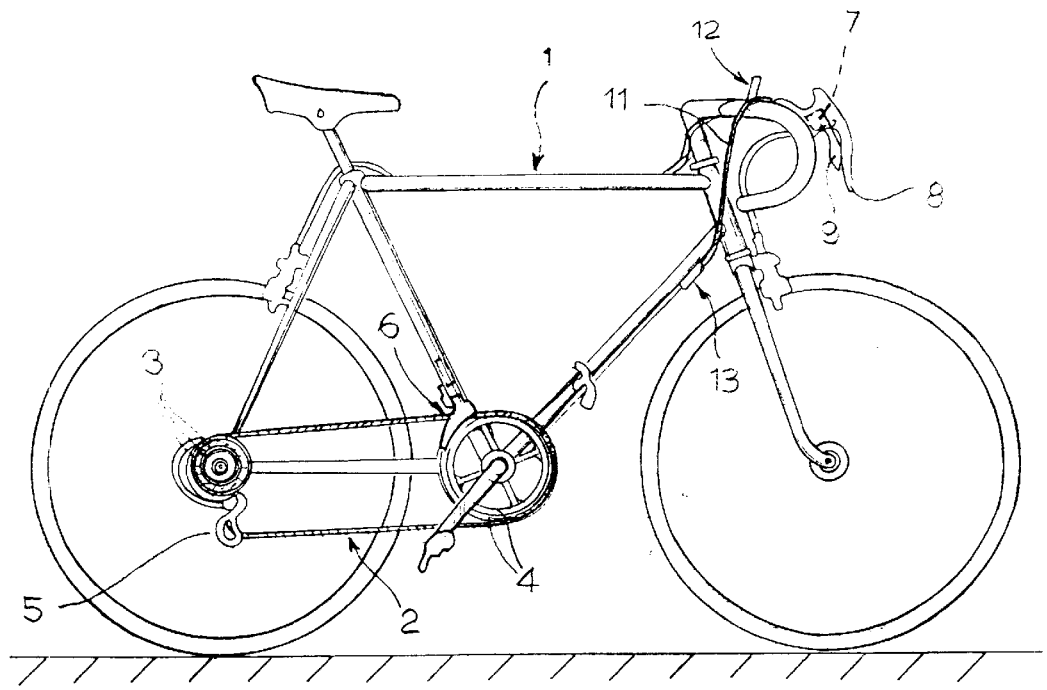
Fig_1
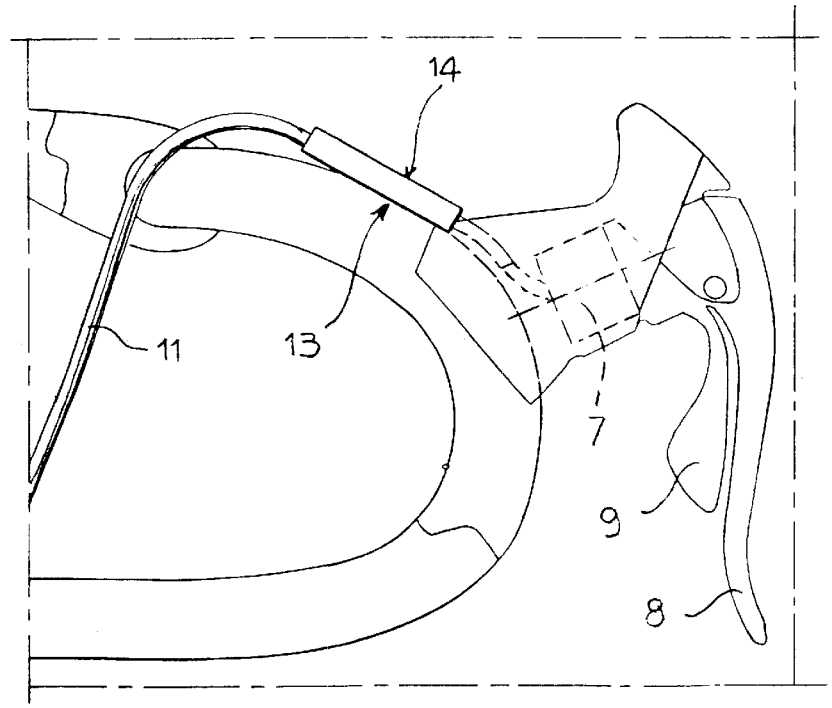
Fig_6

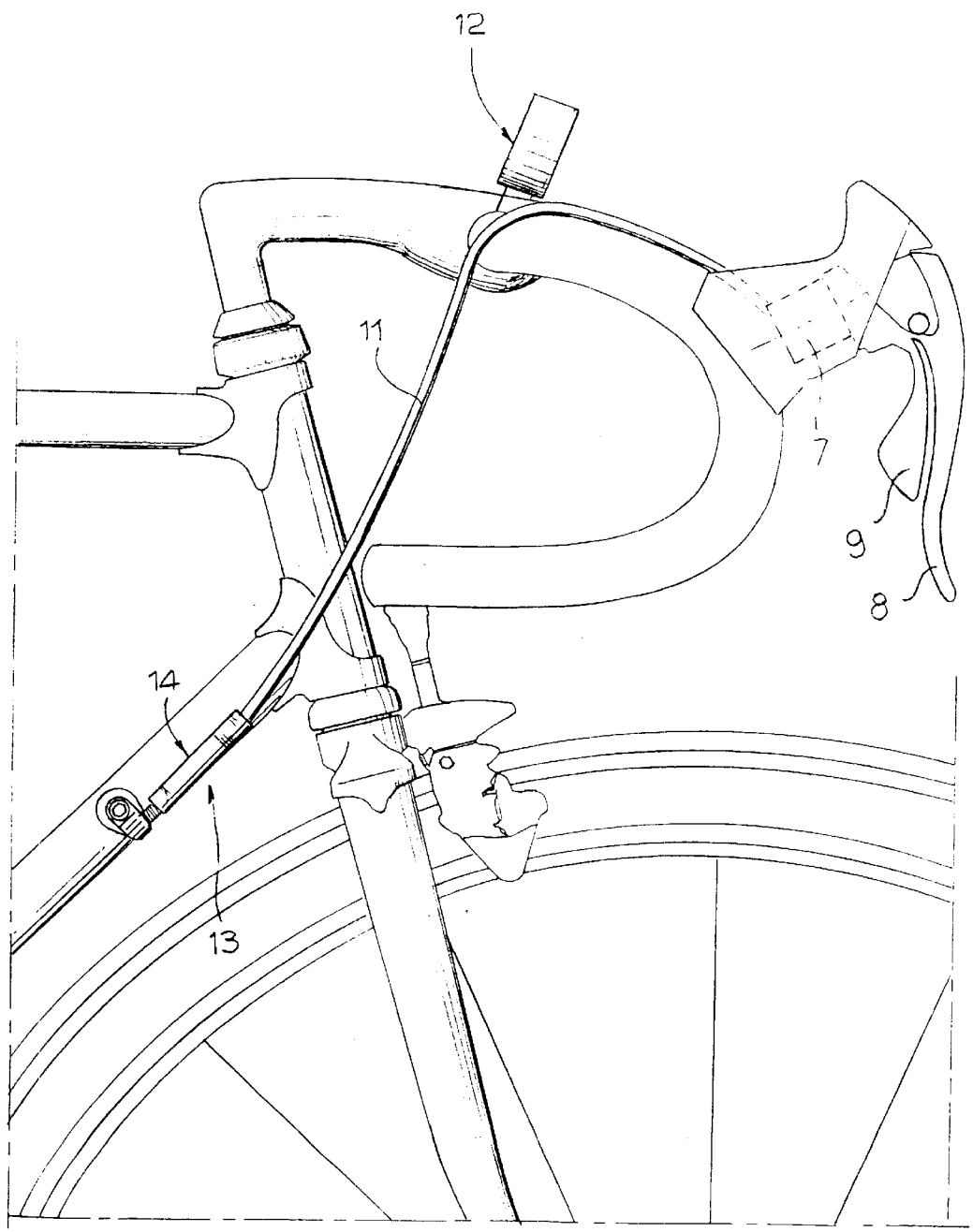
Fig_2

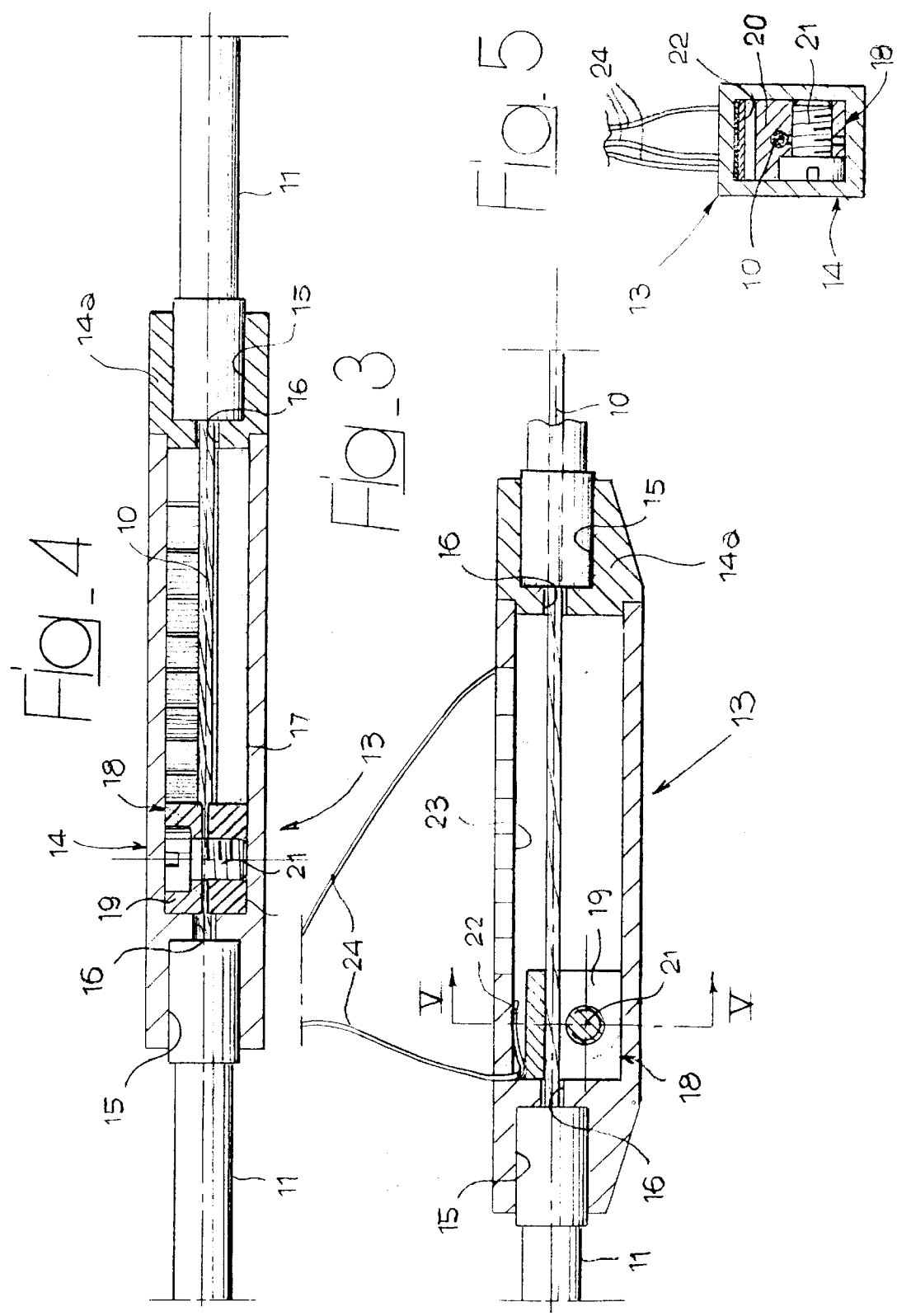

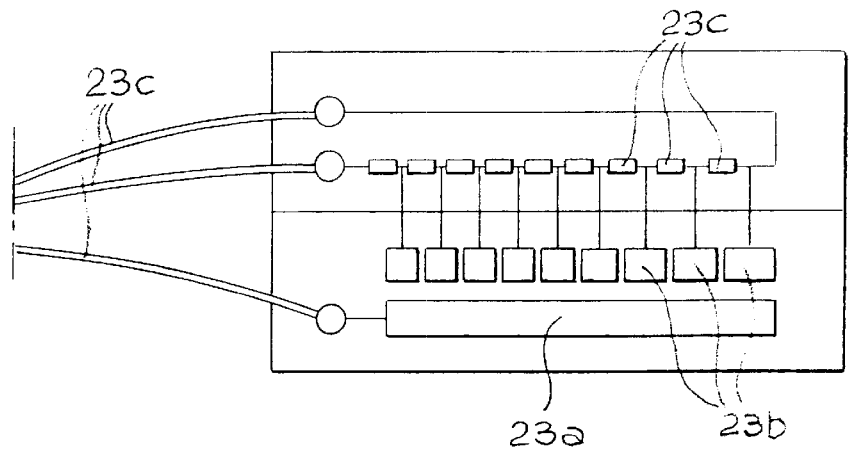
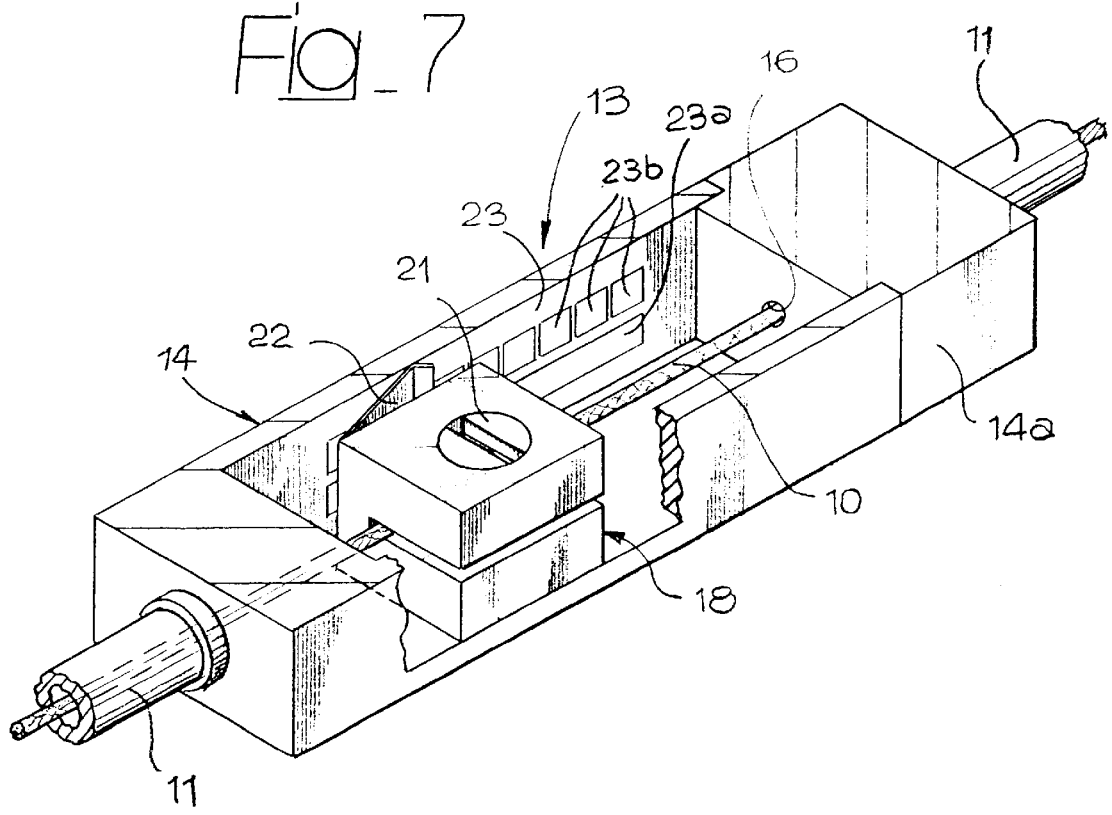

GEAR-CHANGE SYSTEM INCLUDING A SENSOR DEVICE FOR DETECTING THE OPERATION OF A GEAR CHANGE FOR BICYCLES

BACKGROUND OF THE INVENTION

The present invention relates to a gear-change system for bicycles, of the type comprising:

- a (front or rear) derailleur for controlling selective engagement of a bicycle chain on a plurality of gear wheels (sprockets or crank gears);
- a device for controlling the derailleur;
- a flexible control cable which connects the control device to the derailleur;
- an electronic display for displaying the operating condition of the gear-change system; and
- a sensor for detecting the operating position of said control device, designed to emit at output a signal indicating the said position and to send the signal to the said electronic display, the said sensor being associated to said flexible cable and comprising:
    - a shell which is traversed by said flexible cable;
    - a movable reference member which moves together with the cable inside the shell; and
    - sensing means for detecting the position of said reference member with respect to the shell.

A gear-change system of the type specified above, which uses in particular a sensor for detecting the position of the flexible control cable of the aforesaid type, is described and illustrated in EP-A-0 820 926 and in the corresponding document U.S. Pat. No. 5,903,214. In the case of the said known solution, the above-mentioned sensing means for detecting the position of the movable reference member are sensing means without contact, typically a magnetic sensor.

Also known in the prior art are sensors for detecting the operating condition of the gearing system which are not associated to the flexible control cable but rather are mounted directly on the gear-change control device.

Finally, also known in the prior art are sensor-display means for detecting and displaying the operating condition of the bicycle gearing system which consist simply of a reference member associated to the flexible control cable and co-operating with a reference scale present on the shell within which the reference member moves (see, for instance, DE-U-91 13 406 and EP-A-0 647 556). This latter solution uses the device described above both as a sensor device and directly as a display device, and consequently is not suited for more sophisticated applications which make use of a display of an electronic type.

SUMMARY OF THE INVENTION

The purpose of the present invention is to provide a system of the type indicated at the beginning of the present description, i.e., one which is suitable for detecting the operating condition of the gearing system and can be associated to an electronic display, is simple from the constructional standpoint, is reliable, and has a relatively low cost.

With a view to achieving the above purpose, the subject of the invention is a system of the type indicated at the beginning of the present description, characterized in that the aforesaid detecting means consist of a potentiometric sensor comprising a movable contact carried by said reference member, and at least one electrically conductive channel mounted inside the shell of the sensor, on which said movable contact is fitted in such a way that it can slide.

Consequently, in the system according to the invention the sensor device for detecting the operating condition of the gearing is associated to the flexible control cable at any point intermediate between the control device and the derailleur controlled thereby. Consequently, from this standpoint the device according to the invention is of the same type as the device which forms the subject of the document EP-A-0 820 926 and distinguishes itself instead from the other solutions that enable display of the operating condition of the gearing system on an electronic display by making use of a sensor associated directly to the gear-change control device. At the same time, the device is simpler and more reliable than the devices of the prior art described above in so far as it makes use of a potentiometric sensor have the simplified structure described previously.

Of course, the present invention refers both to the gearing system that uses the aforesaid sensor device and to the aforesaid sensor device considered in itself.

BRIEF DESCRIPTION OF THE DRAWINGS

Further characteristics and advantages of the present invention will emerge from the ensuing description, with reference to the attached drawings, which are provided purely to furnish a non-limiting example, and in which:

FIG. 1 is a schematic view of a bicycle that uses a gearing system according to the invention;

FIG. 2 is a view at an enlarged scale of a detail of the bicycle illustrated in FIG. 1, which shows the positioning of the sensor device that forms the subject of the present invention;

FIGS. 3 and 4 are two sectional views of the sensor device according to the invention;

FIG. 5 is a sectional view taken along the line V—V of FIG. 3;

FIG. 6 illustrates a variant of the device of FIG. 2;

FIG. 7 is a schematic perspective view of the device illustrated in FIGS. 3 and 4; and FIG. 8 is a diagram of the electrical channels provided in the device illustrated in FIGS. 3 and 4.

DETAILED DESCRIPTION OF THE INVENTION

With reference to the drawings, the number 1 designates, as a whole, a competition bicycle to which the gearing system according to the invention is applied. It is evident, however, that the system according to the invention may be applied to any type of bicycle. The bicycle 1 comprises a gear chain 2 designed to engage selectively on a set of rear sprockets 3 associated to the rear wheel and on a set of crank gears 4 associated to the crank arms of the bicycle. Selective engagement of the chain 2 on the sprockets 3 is controlled by a rear derailleur 5, whilst selective engagement of the chain 2 on the front crank gears 4 is controlled by a front derailleur 6. The rear derailleur 5 is controlled by a control device 7 (not visible in the drawing) associated to the supporting body of the brake lever 8 mounted on the right-hand side of the handlebars. Also associated to the device 7 is a control lever 9 set behind the brake lever. Likewise, the front derailleur 6 is controlled by a control device (not visible in the drawing) associated to the lever of the left-hand brake and provided with the corresponding control lever (not visible in the drawing either). The device 7 for controlling the rear derailleur 5 is connected to the latter by means of a flexible control cable 10 (FIG. 2). The portions of the flexible cable 10 that are not set inside bicycle parts are set inside portions of sheathing 11.

With reference to FIG. 2, the number 7 designates the assembly for controlling the rear derailleur, which is controlled by the lever 9 set behind the brake lever 8. The reference number 12 designates the body of an electronic display, which is mounted on the handlebars, and which is designed, according to a technique in itself known, to display various parameters processed by an on-board computer in association with corresponding sensor devices, such as ones for speed, distance covered, pedalling rhythm, etc. The display device 12 is moreover designed to display the sprocket 3 and the crank gear 4 that are respectively selected by means of the rear derailleur 5 and the front derailleur 6. For this purpose, a sensor device 13 according to the invention is associated to the flexible cable 10 controlling the rear derailleur 5. The device 13 can be mounted at any intermediate point of the cable, between the control device 7 and the rear derailleur 5. Likewise, a similar sensor device is associated to the flexible cable controlling the front derailleur 6, to enable display of the crank gear 4 selected by means of the front derailleur 6. In the ensuing description, reference will be made exclusively to the conformation and arrangement of the sensor associated to the rear derailleur 5, it being evident that the same description may equally apply to the case of the front derailleur.

With reference in particular to FIGS. 3–5, the sensor device 13 comprises a shell 14 having a basically elongated and tubular shape, with a lid 14a. At its ends, the shell 14 has two seats 15 for receiving the ends of respective stretches of sheath 11 of the flexible control cable. The cable (10 passes right through the shell 14, passing through end holes 16 made at the ends of an internal cavity 17 having a quadrangular section. Inside the cavity 17 is mounted, so that it can slide, a reference member 18 comprising two jaws 19, 20 gripped together by means of a screw 21. The two jaws 19, 20 are clamped on a stretch of the flexible cable 10 so that the reference member 18 is movable together with the flexible cable 10 inside the shell 14, the said shell 14 being instead in a fixed position (whereas the flexible cable 10 is movable) since it is rigidly connected to the portions of sheathing 11. Of course, the device 13 may also be set in such a way that one of the end seats 15 receives the cable of a sheath 11, whilst the other end of the shell 14 is mounted directly on one part (for example, a frame) of the bicycle, as illustrated in FIG. 2.

With reference to FIG. 3, the reference member 18 carries a movable contact 22 which slides on electrically conductive channels 23 carried by the surface of the cavity 17. As may be seen from FIG. 4 and FIG. 8 (which illustrates the two faces of the card bearing the channels 23 developed in a plane), there is provided a first channel 23a and a second channel consisting of a series of conductive pads 23b associated to resistors 23c. The movable contact 22 connects the channel 23a to a pad 23b, so making available a signal which indicates the position of the movable contact 22. Electrical cables 24 connect the device 13 to the electronic control unit on board the bicycle. The aforesaid arrangement consequently enables a sensor of a potentiometric type to be obtained, based on the measurement of the electrical resistance of the device, the said electrical resistance varying as the position of the movable contact 22 varies on the electrical channel 23. The device according to the invention thus presents the advantage, on the one hand, of the possibility of being arranged at any point along the flexible control cable of the derailleur between the control device and the derailleur, and at the same time guarantees the simplicity, reduced cost, and reliability of a sensor of a potentiometric type.

FIG. 6 illustrates a further possible arrangement of the sensor device 13.

Of course, without prejudice to the principle of the invention, the details of construction and the embodiments may vary widely with respect to what is described and illustrated herein purely for the purpose of providing an example, without thereby departing from the scope of the present invention.

What is claimed is:

1. A gear-change system for bicycles, comprising:
   a derailleur for controlling selective engagement of a bicycle chain on a plurality of gear wheels;
   a control device for controlling the derailleur;
   a flexible control cable which connects the control device to the derailleur;
   an electronic display for displaying the operating condition of the gear-change system; and
   a sensor for detecting the operating position of said control device by emitting a signal indicating said position and sending the signal to said electronic display, said sensor being associated to said flexible cable and comprising:
   a shell which is traversed by said flexible cable;
   a reference member which is movable together with the cable inside the shell; and
   sensing means for detecting the position of said reference member with respect to the shell,
   wherein said sensing means comprises a potentiometric sensor comprising a movable contact carried by said reference member and a plurality of fixed spaced apart electrical contacts on an inner surface of the shell of the sensor for engagement by the movable contact upon movement of the reference member lengthwise of the shell.

2. A system according to claim 1, wherein the sensor device is set in any position along the flexible control cable, intermediate between the control device and the derailleur.

3. A system according to claim 1, wherein the shell has an internal cavity inside of which the reference member is slidably disposed, said internal cavity being closed at opposite ends by walls having holes for passage of the flexible control cable, at least one of said holes being located in the bottom of a seat designed to receive a respective end of a sheath for the cable.

4. A system according to claim 3, wherein the reference member comprises two jaws clamped on the flexible control cable by means of screw.

5. A sensor device for detecting the operating position of a bicycle gear-change system, comprising:
   a shell designed to be in a fixed position, with respect to which a flexible cable for controlling a derailleur of the bicycle is movable, said shell being traversed by said cable;
   a reference member connected to the cable inside the shell; and
   sensor means for detecting the position of said reference member with respect to the shell;
   wherein said sensing means comprises a potentiometric sensor comprising a movable contact carried by said reference member and a plurality of fixed spaced apart electrical contacts on an inner surface of the shell of the sensor for engagement by the movable contact upon movement of the reference member lengthwise of the shell.

6. A sensor device according to claim 5, wherein the shell has an internal cavity inside of which the reference member is slidably disposed, said internal cavity being closed at opposite ends by walls having holes for passage of the flexible control cable, at least one of said holes being located in the bottom of a seat designed to receive a respective end of a sheath for the cable.

7. A sensor device according to claim 6, wherein the aforesaid reference member comprises two jaws clamped on the flexible control cable by means of a screw.

8. A sensor device for detecting the operating position of a bicycle gear-change system, comprising a shell, designed to be in a fixed position, and a flexible control cable, for controlling a derailleur of the bicycle, traversing said shell and being movable with respect to the shell; wherein said shell presents an electric resistive path extending along the flexible cable which carries an electric contact, said electric contact being fixed on the flexible cable and moving with it, the electric contact being in electric contact with said electric resistive path and sliding over the resistive path, following the movement of the flexible cable.

9. A sensor device as set forth in claim 8, wherein the electric contact is fixed to the cable through a reference number.

10. A sensor device as set forth in claim 9, wherein the reference member comprises two jaws clamped on the control cable.

11. A sensor device as set forth in claim 8, wherein the resistive path is located on an inner surface of the shell.

12. A sensor device as set forth in claim 8, wherein the resistive path is formed by a number of conductive areas insulated from each other and connected by resistors.

13. A sensor device as set forth in claim 8, wherein in that the electric contact is an elastic blade.

14. A sensor device as set forth in claim 8, wherein said shell has an elongated shape, the resistive path extending along the length of the shell and the cable moving along the length of the shell.

15. A sensor device as set forth in claim 14, wherein said shell has holes for fixing cable seats.

16. A gear-change system of a bicycle comprising a derailleur for controlling selective engagement of a bicycle chain on a plurality of gear wheels, a control device for controlling the derailleur, a flexible control cable which connects the control device to the derailleur and a sensor device for detecting the operating position of the gear-change system, said sensor device comprising a shell, adapted to be fixed on the bicycle, and a flexible control cable, for controlling the derailleur of the bicycle, traversing said shell and being movable with respect to the shell; wherein said shell presents an electric resistive path extending along the flexible cable which carries an electric contact, said electric contact being fixed on the flexible cable and moving with it, the electric contact being in electric contact with said electric resistive path and sliding over the resistive path, following the movement of the flexible cable.

17. A gear-change system as set forth in claim 16, wherein the sensor device is located at any position along the flexible control cable.

18. A gear-change system as set forth in claim 16, wherein the sensor device is located immediately after the control device.

19. A gear-change system as set forth in claim 16, wherein said system comprises a display.

20. A device for detecting the operating position of a bicycle gear-change system having a control device, a gear display, a derailleur, and a control cable connecting the control device to the derailleur, the control cable including an interior flexible cable surrounded by sheathing, said device comprising:

an elongate tubular shell having an elongate internal cavity;

a seat on each end of said shell, in axial alignment with the internal cavity, to receive an end of the sheathing and define an exposed length of the flexible cable within said shell;

a reference member slidably arranged within said shell and including means for adjustably clamping it to a selected location on the exposed flexible cable;

means for detecting the position of said reference member relative to said shell and communicating that position to said gear display, said detecting means comprising a sensor which measures variations in electrical resistance as said reference member moves within said shell.

21. The device recited in claim 20, wherein said detecting means comprises a pair of electrically conductive channels in the internal cavity of said shell.

22. The device recited in claim 21, wherein said reference member is composed of a conductive material and contacts both of said channels to create an electrical connection between said channels.

23. The device recited in claim 20, wherein said detecting means comprises a potentiometric sensor.

24. A device for detecting the operating position of a bicycle gear-change system having a control device, a gear display, a derailleur, and a control cable connecting the control device to the derailleur, the control cable including an interior flexible cable surrounded by a sheath, said device comprising:

means for mounting the device at any point on the control cable intermediate the control device and the derailleur and stationary relative to the interior flexible cable; and, means for detecting the position of said derailleur by detecting movement of the interior flexible cable relative to said device, said detecting means comprising a sensor which measures an electrical resistance across said device which varies as the interior flexible cable slides relative the device.

25. The device recited in claim 24, said detecting means comprising a potentiometric sensor.

* * * * *